S. N. BARUCH.
ELECTRIC CIRCUIT PROTECTOR.
APPLICATION FILED JUNE 15, 1914.

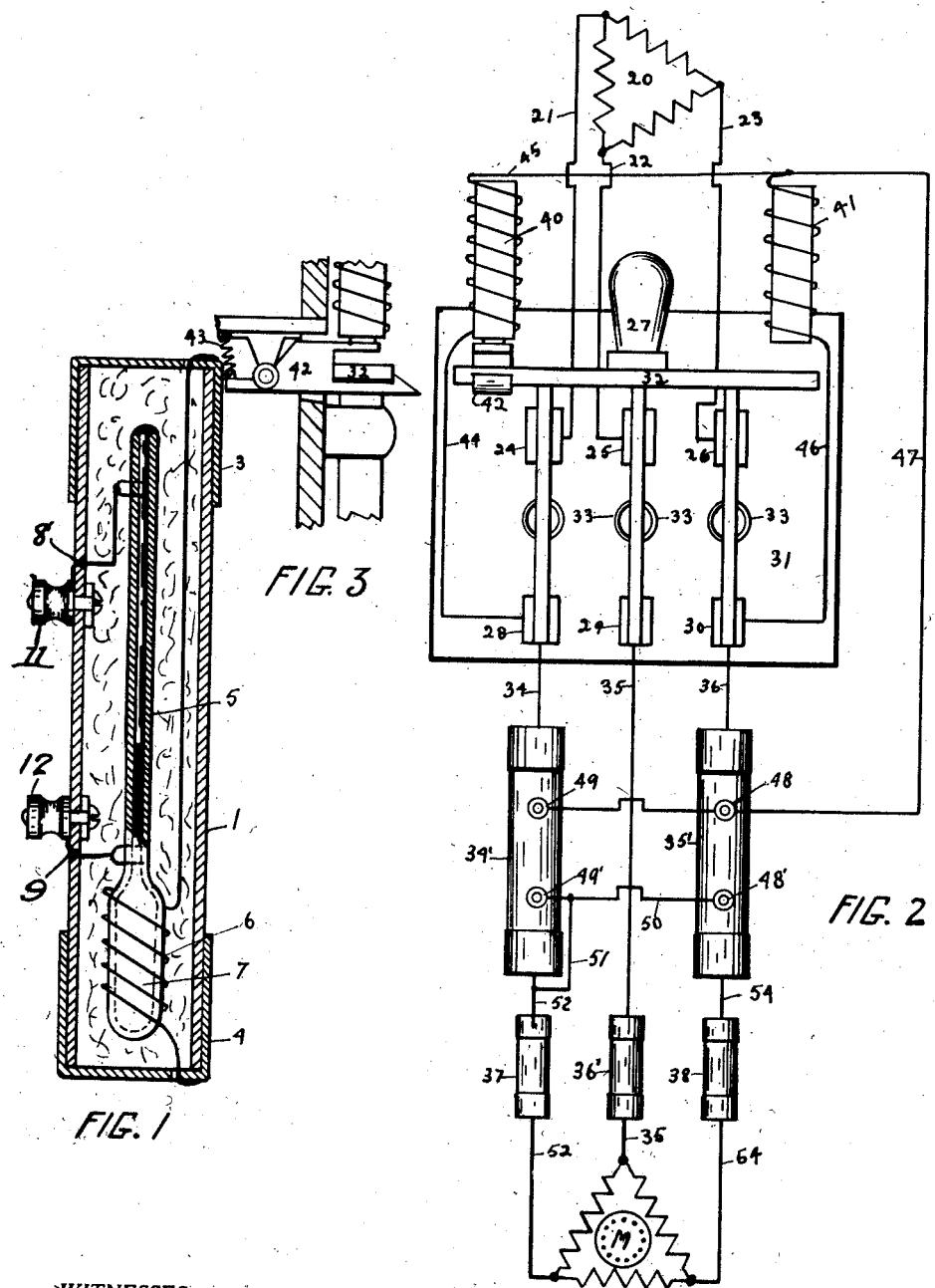

1,281,482.

Patented Oct. 15, 1918
2 SHEETS—SHEET 2.

WITNESSES:
E. A. Gardner.
A. H. Kephart.

INVENTOR.
S. N. Baruch.
BY
Carlos P. Griffin
ATTORNEY

UNITED STATES PATENT OFFICE.

SYDNEY NORTON BARUCH, OF OAKLAND, CALIFORNIA, ASSIGNOR TO BARUCH ELECTRIC CONTROLLER CORPORATION, OF OAKLAND, CALIFORNIA, A CORPORATION OF CALIFORNIA.

ELECTRIC-CIRCUIT PROTECTOR.

1,281,482.	Specification of Letters Patent.	Patented Oct. 15, 1918.

Application filed June 15, 1914.   Serial No. 845,129.

*To all whom it may concern:*

Be it known that I, SYDNEY N. BARUCH, a citizen of the United States, residing at Oakland, in the county of Alameda, State of California, have invented a new and useful Electric-Circuit Protector, of which the following is a specification in such full and clear terms as will enable those skilled in the art to construct and use the same.

This invention relates to a thermo protector for electric apparatus, especially illustrated with a three phase motor. It is commonly known to those skilled in the art that when a three phase motor starts up it takes several times its normal full load running current or amperage and should an attempt be made to start the motor with one fuse out leaving but a single phase in circuit with the motor, it would continue to take several times its normal running current without starting up. This would burn it. Likewise, should the motor be running and one of the fuses be blown after the motor has started either in the primary or secondary circuits the motor perhaps if a large one would continue to run but would take through the single phase in circuit twice its normal full load current capacity and also burn up.

Now, the principal object of this invention is to eliminate the possibility of the motor burning up or any other electrical apparatus from either an overload or from the current being cut off the line and coming back on again when the motor is at a standstill.

The device of my invention comprises an element which is arranged in the circuit in series with the windings of an electrical apparatus to be protected and which becomes heated by the current to a temperature which is always in direct proportion to the temperature produced in the apparatus. This is accomplished by arranging the heating element in the device so that it has a heating characteristic which is proportional to the heating characteristic of the conductors of the apparatus. This condition is preferably brought about by inclosing the heating element in a chamber formed of a shell of suitable material, so that the heat radiating capacity of the device is directly proportional to the heat radiating capacity of the apparatus. This causes the temperature of the heating element to bear a fixed relation at all times during the passage of current to the temperature of the apparatus. The device is so arranged that it operates to open the electric circuit in advance of the production of a destructive temperature in the apparatus. The device may also be used to set off an alarm to indicate the presence of dangerous temperatures.

An embodiment of the invention is shown in the drawing in which the same reference numeral is applied to the same portion throughout, but I am aware that there are many modifications thereof.

Figure 1 is a sectional view of the device,

Fig. 2 is a diagrammatic view of a circuit having this cutting out apparatus applied thereto, Fig. 3 is a side elevation of the switch holding latch.

Figure 4:
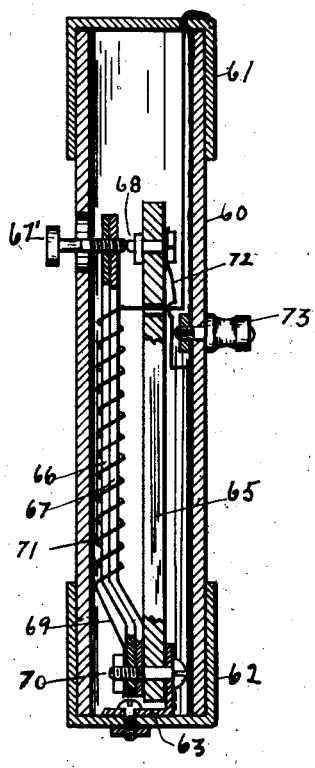
Fig. 4 is a vertical sectional view of a modified form of protective apparatus in which a metal thermometer is used.

The numeral 1 represents a fiber shell such as is commonly used for fuses, said shell having metal caps 3 and 4. Within the shell a heat responsive device, preferably a thermometer 5 is placed, said thermometer having a heating element comprising a suitable coil of wire 6 around the bulb 7. The wire is connected at both ends to the metal caps for the transmission of the current.

Connected with the upper end of the thermometer is a wire 8 while at the lower end of the bead there is a wire 9, each of said wires being connected with the mercury bead and terminating at their other ends in binding posts 11 and 12.

An installation illustrating a specimen application of the device to a three wire system in which it is particularly valuable is shown in Fig. 2. In this figure 20 illustrates a suitable source of three phase current transmitted over wires 21, 22, 23 to the points 24, 25, 26 of a suitable three blade knife switch 27, said blades being pivoted in a well known manner to posts 28, 29 and 30 secured on the block 31. Each blade is connected to the handle cross bar 32 and each blade bears on a coil spring 33 connected to the base block 31.

Wires 34, 35, 36 lead from the switch points to the thermometer tubes 34', and 35' and to the fuse 36', other fuses 37 and 38 being inserted in the lines leading to the motor M.

Installed on the switch block are two coils 40 and 41. The function of the coil 40 is to hold the pivoted latch 42 up against the tension spring 43. This spring is strong enough when the coil is not energized to release the latch 42, but is not strong enough to release the latch when current is passing in the coil 40 since it is made of iron and is held against the core of the coil 40 strongly. The coil 40 has a wire 44 extending to one switch point, a wire 45 extends to the coil 41, which coil has a wire 46 connected with the main wire 23. The wire 45 is connected with the wire 47 which leads to the thermometer connections 48 and 49 on both protector tubes. The lower thermometer connections 48' and 49' have a wire 50, which wire is connected with a wire 51 leading to the wire 52 which extends to the motor M, the fuse 37 being interposed for a purpose well known.

From the central knife switch a wire 35 leads through the fuse 36' to the motor, it being unnecessary to protect this wire since the protector apparatus will operate on an increase of current in any two of the circuits.

Extending from the bottom connection 48' of one of the protector tubes is a wire 54 leading to the motor through the fuse 38.

The operation of the apparatus is as follows: Assuming such an overload to come upon the motor as would blow out one of the fuses but not sufficient of a load to blow out all of the fuses, the two remaining wires would then continue to feed current to the motor, but to maintain the necessary power would take more of a current than they should, whereupon one of the protector tubes, or possibly both, would have its thermometer unduly heated. The wire 50 would then be electrically connected with the wire 47 by means of either of the thermometer beads. This would result in cutting out the coil 40, whereupon the latch 42 would be released and the spring operating upon the blades of the knife switch would immediately disengage the switch points and stop the motor.

It will be observed that it makes no difference which of the wires 52, 35 or 54 are cut out of the circuit, the coil 40 will be demagnetized upon an increase of the load in the two remaining lead wires and release the switch.

The heating characteristic of the thermal protective device bears a fixed relation to the heating characteristic of the motor, preferably having the same heating characteristic and the device is preferably so set that it reaches its critical temperature in advance of a destructive temperature in the motor, thereby causing the motor to be adequately protected.

Other applications of the protective apparatus will be readily apparent to those skilled in the art.

In order to cause the thermometer which may be of any desired kind to work with as little current as possible the casing surrounding the thermometer is filled with asbestos, or magnesia wool or any other convenient packing which serves to accumulate the heat, thereby requiring a very short length of wire.

Figure 5:
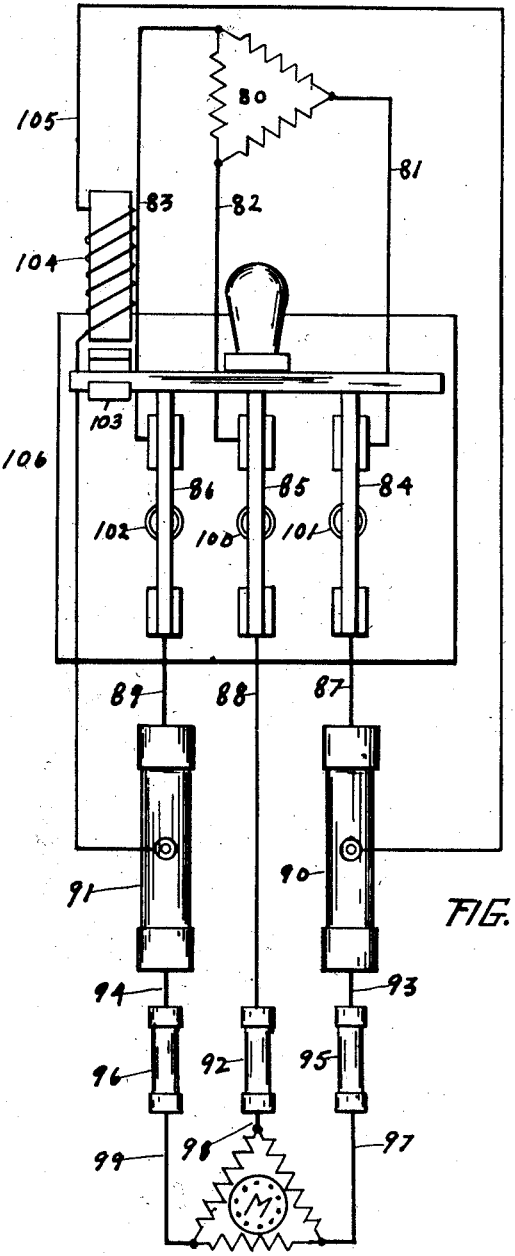
Fig. 5 is a diagrammatic view of a three phase circuit protected by this device.

A modified form of the invention is shown in Figs. 4 and 5. In these figures the numeral 60 represents a fiber shell having metal caps 61 and 62, to one of which caps an L shaped plate 63 is secured. This plate carries a porcelain rod 65 which rod has the thermal pile plates 66 and 67 connected thereto at the lower end. These plates carry an adjusting screw 67' at their upper end, which screw bears upon a contact screw 68 secured in the upper end of the porcelain bar. A wire 69 is connected with the lower binding post 70 which secures the thermal elements to the porcelain bar, said wire being formed into a coil at 71 and being connected to the upper metallic cap. Another wire 72 extends from the upper contact point on the porcelain bar to a binding post 73 on the front of the tube.

This apparatus operates by disconnecting the two contact points within the tube when the coil is overheated. It is applied to a three wire electrical system such as is illustrated in Fig. 2 as shown in Fig. 5, in which the generator is illustrated at 80, the wires 81, 82 and 83 leading to the knife switch bars 84, 85 and 86 from which bars wires 87 and 89 lead to the upper contacts of the protecting devices 90 and 91. The wire 88 leads to a fuse 92, while wires 93 and 94 lead from the lower contacts of the protecting devices to the fuses 95 and 96 from wires 97, 98 and 99 leading to the motor M.

The switch knives are normally held out of contact by means of suitable springs 100, 101 and 102, a latch 103 precisely the same as the latch shown in Fig. 3 being used to hold the switch bars in contact. This latch is held up by means of the electromagnet 104, wires 105 and 106 leading to the two protective devices 90 and 91 respectively.

The operation of the apparatus is as follows: When the knife switch is thrown in current will pass to the motor and also to the coil 104, whereupon said magnet will hold the knife switch in the closed position. However, should one of the protective devices become overheated from any cause it will break the contact through either the wire 105 or the wire 106 and the magnet will then release the latch and permit the knife switch bars to fly out. It is to be observed that the devices shown in Figs. 1 and 2 operate on the closing of a circuit, while the devices shown in Figs. 4 and 5 operate upon the opening of a circuit.

It will be understood by those skilled in the art that while a "coil" has been mentioned as necessary to heat the thermometer that said term is purely a relative one and may refer to a single length of wire adjacent which the thermometer is placed, if the current used is heavy enough to maintain the desired temperature in the protective apparatus.

Having thus described my invention what I claim as new and desire to secure by Letters Patent of the United States, is as follows, modifications within the scope of the claims being expressly reserved:

1. A protective device for an electric circuit containing electric apparatus comprising an element in circuit with said apparatus, a thermal responsive device thermally associated with said element, said element and device having a heating characteristic corresponding directly to the heating characteristic of the apparatus, and means operative by an increase in temperature of said thermal responsive device to open the circuit.

2. A protective device for an electric circuit containing electric apparatus having an insulated conductor, comprising an element in circuit with said apparatus, a thermal responsive device thermally associated with said element, said element and device having a heating characteristic corresponding directly to the heating characteristic of said conductor, and means operating by an increase in temperature of said element to a predetermined temperature to open the circuit.

3. A protective device for an electric circuit containing electric apparatus comprising an element adapted to be heated in proportion to the load on the apparatus, a thermal responsive device thermally associated with said element, heat insulating means surrounding the heating element and thermal responsive device, whereby said element and device have a heating characteristic corresponding to the heating characteristic of the apparatus and means operative by an increase in temperature of the thermal responsive device to a predetermined temperature to open the circuit.

4. A protective device for an electric circuit containing electric apparatus having an insulated conductor, comprising an element adapted to be heated in proportion to the load on the apparatus, a thermal responsive device thermally associated with said element, a casing of heat insulating material surrounding the heating element and thermal responsive device, said parts being so proportioned and arranged that said element and device have a heating characteristic corresponding to the heating characteristic of the conductor, and means operative by an increase in temperature of the thermal responsive device to a predetermined temperature, to open the circuit.

5. The combination with an electrical apparatus and an auxiliary device associated therewith, to reproduce the temperature condition obtaining in substantially the hottest portion of said electrical apparatus, and a thermal responsive device thermally associated with said auxiliary device, of means responsive to said thermally responsive device for precluding a further temperature rise above a predetermined value in said hottest portion.

6. The combination with an electrical apparatus, a thermal responsive device associated therewith, and means for influencing the thermal device in accordance with the current traversing the electrical apparatus, said thermal responsive device and said means having the same heating characteristic as said electrical apparatus in order to reproduce the temperature condition obtaining in substantially the hottest portion of said electrical apparatus, of means controlled by said thermal device for substantially precluding further temperature rise above a predetermined value in said hottest portion.

7. In a device for precluding a temperature rise above a predetermined value in a selected portion of an electrical apparatus, the combination with an electric current-carrying apparatus and a thermal device associated therewith, of a heating coil associated with said thermal device and traversed by current flowing through said apparatus, said thermal device and heating coil having the same heating characteristic as said apparatus for reproducing the temperature condition in a selected portion of said electrical apparatus.

8. A protective device for an electric circuit containing electric apparatus comprising an element in circuit with said apparatus, a switch in said circuit, means for operating said switch and thermal responsive means thermally associated with said element and operative by an increase in temperature to a predetermined temperature to actuate said switch operating means, said element and thermal responsive device having a heating characteristic corresponding directly to the heating characteristic of said apparatus.

9. A protective device for an electric circuit containing electric apparatus, comprising an element in circuit with said apparatus, a switch in said circuit, an electromagnet for controlling said switch, a circuit including said electromagnet, and thermal responsive means thermally associated with said element and operative by an increase in temperature to a predetermined temperature to control said electromagnet circuit, said element and thermal responsive device having a heating characteristic corresponding directly to the heating characteristic of said apparatus.

10. A protective device for an electric circuit containing electric apparatus comprising an element adapted to be heated in proportion to the load on the apparatus, a switch in said circuit, means for operating said switch and thermally responsive means thermally associated with said element operative by an increase in temperature to a predetermined temperature to actuate said switch operating means, and heat insulating means surrounding the heating element and thermal responsive means, whereby the heating element and thermal responsive means has a heat characteristic corresponding to the heat characteristic of the apparatus.

11. The combination with an electric circuit containing electric apparatus, of an auxiliary device associated therewith to reproduce the temperature condition obtaining in substantially the hottest portion of said electric apparatus, of a switch in said circuit, means for operating said switch and means operative by the thermo action of said auxiliary device for actuating said switch operating means for precluding a further temperature rise above a predetermined value in said hottest portion.

12. A protective device for opening an electric circuit containing electric apparatus upon a temperature rise above a predetermined value in said circuit, comprising an element in circuit with said apparatus, and a thermal responsive device thermally associated with said element, said element and device having a heating characteristic corresponding directly to the heating characteristic of the apparatus.

In testimony whereof I have hereunto set my hand this 9th day of June A. D. 1914, in the presence of the two subscribed witnesses.

SYDNEY NORTON BARUCH.

Witnesses:
C. P. GRIFFIN,
HENRY B. LISTER.